United States Patent [19]
Gardner

[11] Patent Number: 5,861,614
[45] Date of Patent: Jan. 19, 1999

[54] SELF-SERVICE TERMINAL AND METHOD OF PERFORMING A MAINTENANCE OPERATION OF A CARD READER OF A SELF-SERVICE TERMINAL

[75] Inventor: John Gardner, Fife, Scotland

[73] Assignee: NCR Corporation, Dayton, Ohio

[21] Appl. No.: 837,255

[22] Filed: Apr. 10, 1997

[30] Foreign Application Priority Data

Dec. 18, 1996 [GB] United Kingdom ............... 9626197

[51] Int. Cl.⁶ ..................................................... G06F 17/60
[52] U.S. Cl. ........................................... 235/379; 235/381
[58] Field of Search ................................. 235/375, 380, 235/381, 379; 902/22, 26, 27

[56] References Cited

U.S. PATENT DOCUMENTS

| | | | |
|---|---|---|---|
| 5,253,167 | 10/1993 | Yoshida et al. | 902/6 |
| 5,397,886 | 3/1995 | Mos et al. | 235/475 |
| 5,784,439 | 7/1998 | Nagelmann et al. | 235/379 |

*Primary Examiner*—Anita Pellman Gross
*Assistant Examiner*—Drew A. Dunn
*Attorney, Agent, or Firm*—Michael Chan

[57] ABSTRACT

A self-service terminal in the form of an automated teller machine (ATM) is provided for communicating across a network with a remote terminal. The ATM comprises a card reader having a transport path and a card entry slot at one end of the transport path for receiving a user identification card from an ATM user to enable the ATM user to gain access to the ATM. A card resides in a position adjoining the card reader and is movable between a first position and a second position along the transport path of the card reader. A transport mechanism is provided for moving the card between the first and second positions. A processor unit is provided for controlling the transport mechanism to move the card between the first and second positions in response to command signals received from the remote terminal. The card may be a diagnostic type of card having a size which is substantially identical to the size of a standard magnetic stripe card. The processor unit controls the transport mechanism to move the diagnostic card between the first and second positions perform a maintenance operation of the card reader in response to the command signals from the remote terminal. Alternatively, the card may be a cleaning type of card having a size which is substantially identical to the size of a standard magnetic stripe card. The processor unit controls the transport mechanism to move the cleaning card between the first and second positions to clean parts of the card reader in response to the command signals from the remote terminal.

11 Claims, 11 Drawing Sheets

5,861,614

SELF-SERVICE TERMINAL AND METHOD OF PERFORMING A MAINTENANCE OPERATION OF A CARD READER OF A SELF-SERVICE TERMINAL

BACKGROUND OF THE INVENTION

The present invention relates to a self-service terminal, and is particularly directed to an automated teller machine (ATM) and a method of performing a maintenance operation of a card reader of an automated teller machine.

A typical ATM includes a card reader having a transport path and a card entry slot at one end of the transport path for receiving a user identification card from an ATM user to enable the ATM user to gain access to the ATM. When a customer inserts a user identification card into the card entry slot of the card reader, the card reader reads data contained on the card. The customer is then prompted on a display to enter a personal identification number (PIN) via a key pad. After the correct PIN is entered, menus are displayed on the display to enable the customer to carry out the desired transaction.

The card reader is a key component of the ATM. A service technician periodically performs maintenance operations on the card reader to maintain smooth and proper functioning of the card reader. A component failure in the card reader is often diagnosed by the service technician. Typically, the technician goes to the particular site of the failure and loads and executes diagnostic software, which alerts the technician of possible causes for the failure. The technician must then order parts. This method of diagnosing a card reader at an ATM is time-consuming and costly.

SUMMARY OF THE INVENTION

In accordance with one aspect of the present invention, a method of performing a maintenance operation of a card reader of a self-service terminal (SST) from a remote location comprises the steps of (a) moving a card residing in a position adjoining the card reader from a resting position to a testing position along a transport path of the card reader in response to commands from a person at the remote location to enable the person at the remote location to perform a maintenance operation of the card reader, and (b) returning the card from the testing position to the resting position after the maintenance operation of the card reader has been performed in step (a).

The card may be moved from the resting position to the testing position to perform a diagnostic test on the card reader based upon information contained on the card when the card is in the testing position. If the card reader functioned properly, then an indication thereof is provided after the card has returned to the resting position in step (b). If the card reader malfunctioned, then an indication thereof is provided after the card returns to the resting position in step (b). Alternatively, the card may be moved between the resting position and the testing position to clean parts of the card reader.

In accordance with another aspect of the present invention, a self-service terminal (SST) is provided for communicating across a network with a remote terminal. The SST comprises a card reader having a transport path and a card entry slot at one end of the transport path for receiving a user identification card from a SST user to enable the SST user to gain access to the SST. A card resides in a position adjoining the card reader and is movable between a first position and a second position along the transport path of the card reader. A transport mechanism is provided for moving the card between the first and second positions. A processor unit is provided for controlling the transport mechanism to move the card between the first and second positions in response to command signals received from the remote terminal.

Preferably, the card is a diagnostic type of card having a size which is substantially identical to the size of a standard magnetic stripe card. The processor unit controls the transport mechanism to move the diagnostic card between the first and second positions to perform a maintenance operation of the card reader in response to the command signals from the remote terminal. Alternatively, the card may be a cleaning type of card having a size which is substantially identical to the size of a standard magnetic stripe card. The processor unit controls the transport mechanism to move the cleaning card between the first and second positions to clean parts of the card reader in response to the command signals from the remote terminal.

DETAILS OF THE INVENTION

Figure 1:
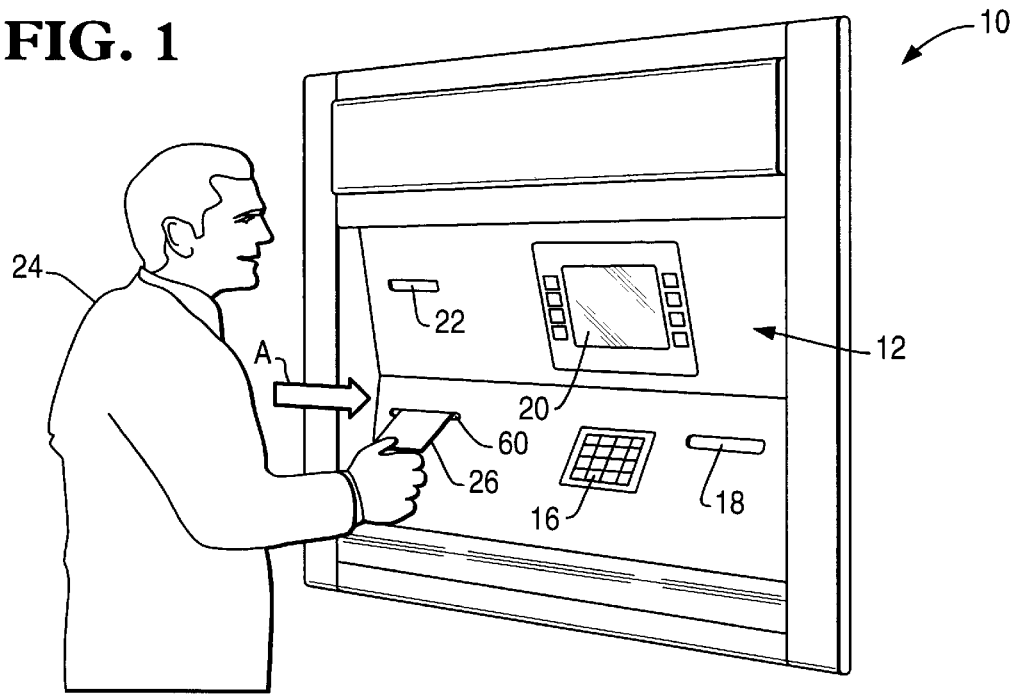
FIG. 1 is a perspective view of an automated teller machine (ATM) embodying the present invention.

The present invention is directed to a self-service terminal (SST) and a method of performing a maintenance operation of a card reader of the SST. The specific construction of the SST may vary. An SST in the form of an automated teller machine (ATM) 10 embodying the present invention is illustrated in FIGS. 1 and 2.

The ATM 10 comprises a user interface in the form of a front panel 12. The front panel 12 includes a card reader 60, a key pad 16, a cash dispenser 18, a CRT display 20, and a receipt printer 22. As particularly shown in FIG. 1, the card reader 60 has a card entry slot through which a customer 24 can insert a user identification card 26 at the commencement of a transaction to be conducted by the customer. The cash dispenser 18 has a cash slot through which cash currency notes stored inside the ATM 10 can be delivered to the customer 24 during the transaction. The receipt printer 22 has a receipt slot through which a receipt of the transaction is delivered to the customer 24 at termination of the transaction.

When the customer 24 inserts the user identification card 26 into the card entry slot of the card reader 60, the card reader reads data contained on the card. The customer 24 is then prompted on the CRT display 20 to enter a personal identification number (PIN) via the key pad 16. After the correct PIN is entered, menus are displayed on the display 20 to enable the customer 24 to carry out the desired transaction. After the transaction is completed, the receipt printer 22 prints a receipt of the transaction and delivers the receipt through the slot of the receipt printer 22 to the customer 24.

Figure 2:
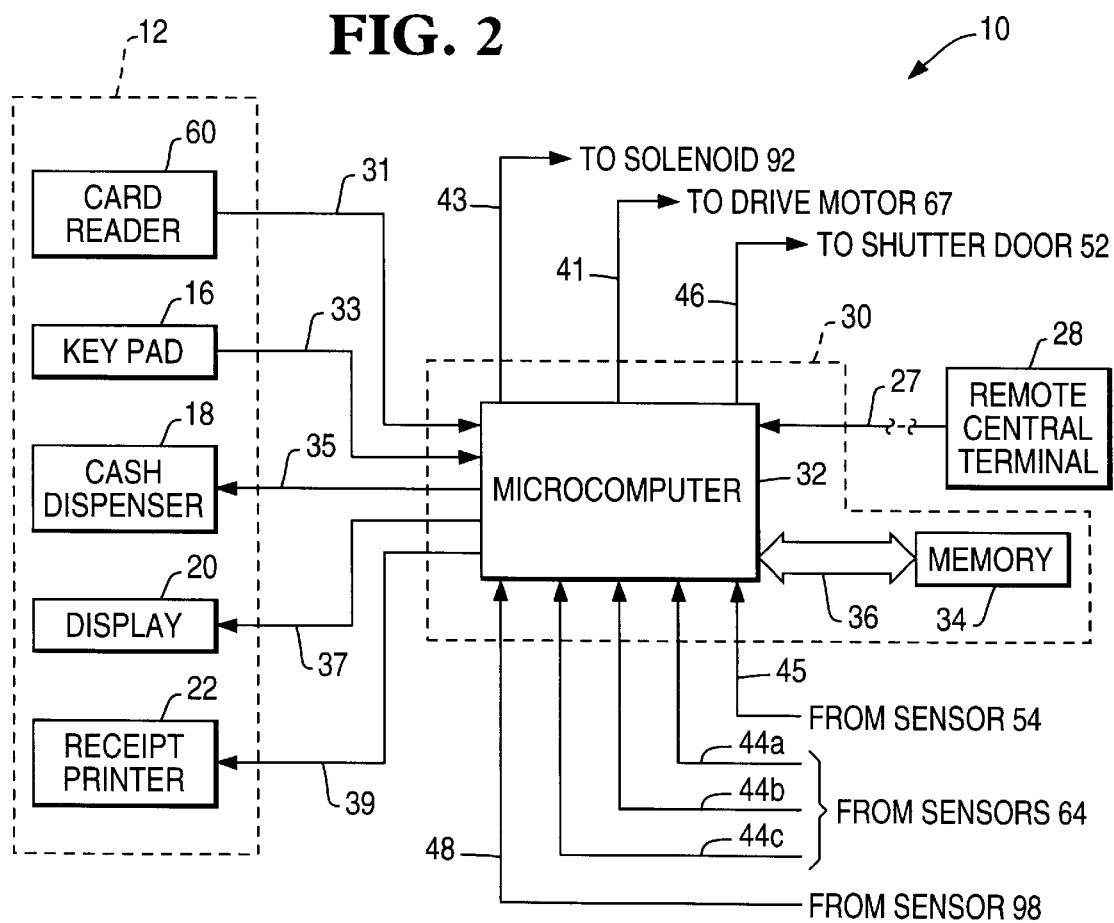
FIG. 2 is a block diagram representation of the ATM of FIG. 1.

Referring particularly to FIG. 2, the ATM 10 further comprises a controller unit 30 which communicates with components of the front panel 12. The controller unit 30 includes a microcomputer 32 and a memory 34 connected via bus line 36 to the microcomputer 32. The microcomputer 32 receives input signals on lines 31, 33 from the card reader 60 and the key pad 16, respectively, and provides output signals on lines 35, 37, 39 to the cash dispenser 18, the display 20, and the receipt printer 22, respectively, to control the amount of cash dispensed by the cash dispensed by the cash dispenser 18, the information displayed on the display 20, and the information printed by the receipt printer 22. The memory 34 may be non-volatile RAM. Suitable microcomputers and memories are readily available in the marketplace. Their structure and operation are well known and, therefore, will not be described.

The microcomputer 32 communicates via line 27 with a central terminal 28 located remotely from the ATM 10. Preferably, the line 27 is a proprietary network owned or leased by the financial institution owning the ATM 10. The remote central terminal 28 may be located at headquarters of the financial institution owning the ATM 10.

Figure 3:
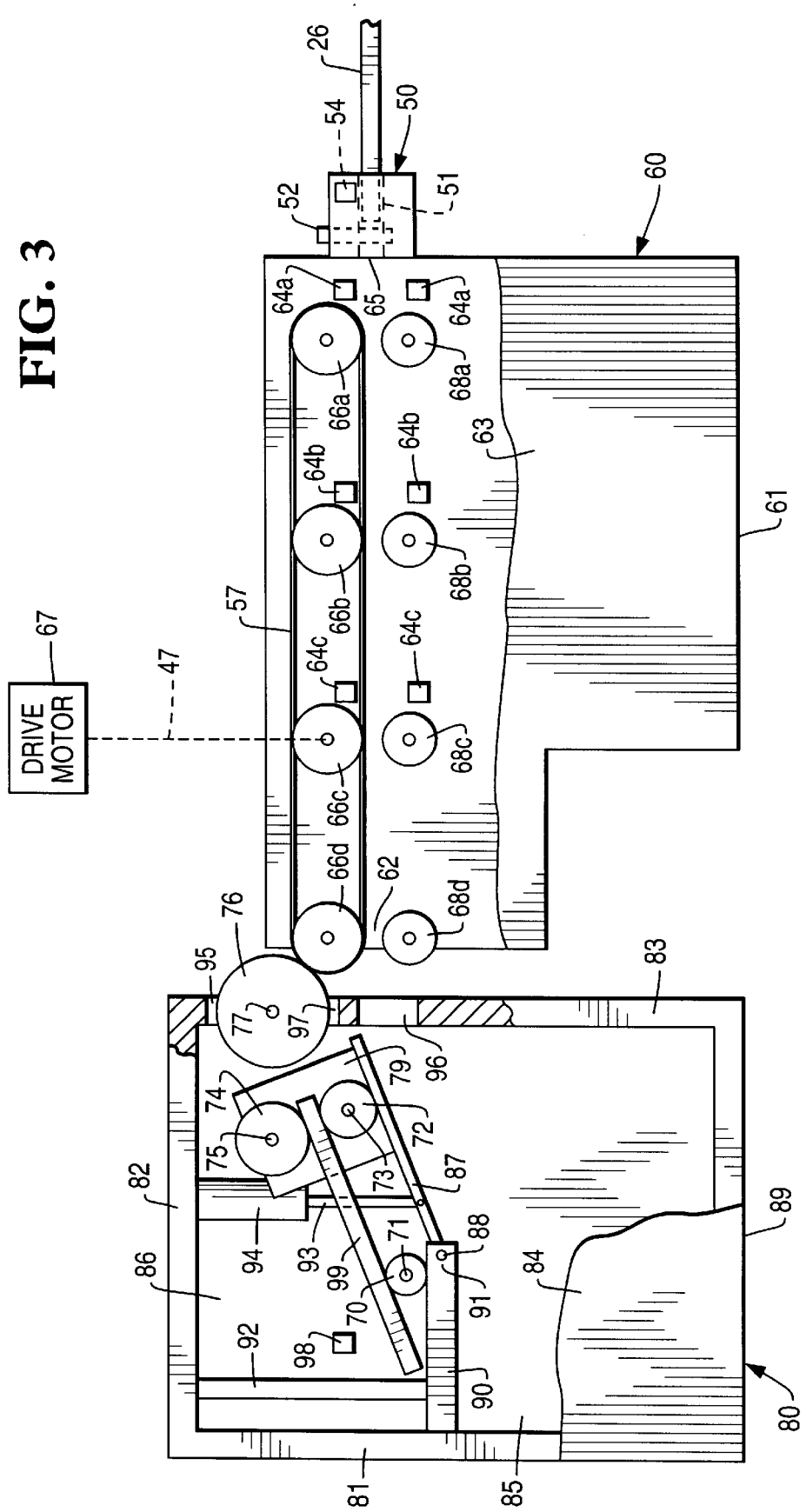
FIG. 3 is a view looking generally in the direction of arrow A of FIG. 1, with certain portions broken away and some parts shown only schematically.

Referring to FIG. 3, the card reader 60 comprises an enclosure 61 including a side wall portion 63 which is shown broken away in FIG. 3 to show details of a transport path 62 defined within the enclosure. The card entry slot of the card reader 60 is designated as reference numeral "65" in FIG. 3. The card entry slot 65 is disposed at one end of the transport path 62. The card reader 60 further includes a number of sensors 64a, 64b, 64c located along the transport path 62, a plurality of drive rollers 66a, 66b, 66c, 66d which are disposed on one side of the transport path, and a plurality of idler rollers 68a, 68b, 68c, 68d which are disposed on the other side of the transport path.

Preferably, each of the sensors 64a, 64b, 64c includes a light source located on one side of the transport path 62 and a light sensor facing the light source and located on the other side of the transport path. The sensors 64a, 64b, 64c are collectively referred to herein as "sensors 64". The drive rollers 66a, 66b, 66c, 66d are collectively referred to herein as "drive rollers 66". Similarly, the idler rollers 68a, 68b, 68c, 68d are collectively referred to herein as "idler rollers 68".

An endless belt 57 extends around the drive rollers 66, as shown in FIG. 3. The endless belt 57 defines the transport path 62. A drive motor 67 is operatively coupled (schematically shown as broken line 47 in FIG. 3) to the drive rollers 66 to rotate these rollers about their longitudinal central axes. The drive motor 67 is controlled by the microcomputer 32 via line 41 (shown only in FIG. 2). The microcomputer 32 monitors signals on line 44a, 44b, 44c (shown only in FIG. 2) from the sensors 64a, 64b, 64c, respectively, and controls operation of the drive motor 67 on line 41 in response thereto. The drive motor 67 drives the endless belt 57 to move a user identification card along the transport path 62 in a known manner.

A card capture bin 80 adjoins the card reader 60, as shown in FIG. 3. The capture bin 80 includes an enclosure 89 having a top wall portion 82 interconnecting opposite back and front wall portions 81, 83. A side wall portion 84 of the capture bin 80 is shown broken away to show details of the interior of the capture bin. A generally rectangular slot 96 is defined in the front wall portion 83. The slot 96 is aligned with the transport path 62 and has a size such that a user identification card is able to move from the transport path through the slot.

A shutter mechanism 50 is located in front of the card entry slot 65 of the card reader 60, as shown in FIG. 3. The shutter mechanism 50 has a shutter passage 51 which aligns with the card entry slot 65 such that the user identification card 26 inserted by the customer 24 is able to be moved through the shutter passage and the card entry slot into the transport path 62. The shutter mechanism 50 includes a shutter door 52 which is movable between a closed position which blocks the shutter passage 51 (as shown in FIG. 3) and an open position which unblocks the shutter passage (as shown in FIG. 4) to allow the user identification card 26 to move through the shutter passage into the transport path 62.

A sensor 54 is disposed along the shutter passage 51 and is located in a position which enables the user identification card 26 being inserted by the customer 24 to be detected. When the sensor 54 detects the presence of the leading edge of the user identification card 26 in the shutter passage 51 (as shown in FIG. 3), the sensor 54 provides an output signal on line 45 (shown only in FIG. 2) indicative thereof. The microcomputer 32 monitors the signal on line 45 and provides a control signal on line 46 to move the shutter door 52 from the closed position shown in FIG. 3 to the open position shown in FIG. 4 in response to the signal on line 45. The structure and operation of the shutter mechanism 50 including the shutter door 52 are known and, therefore, will not be described in detail.

Figure 4:
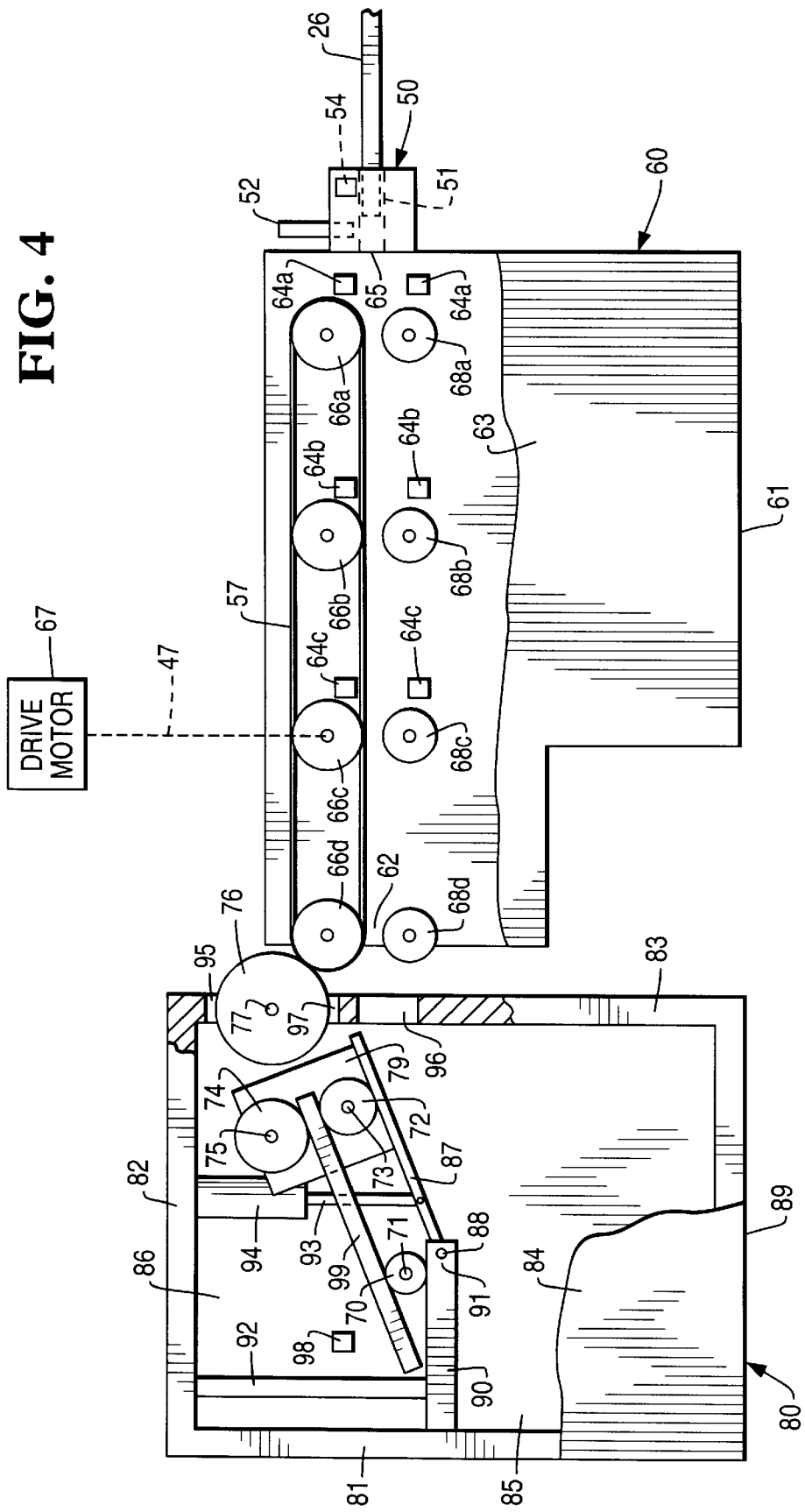
FIG. 4–12 are views similar to FIG. 3 and showing parts in different positions.
Figure 5:
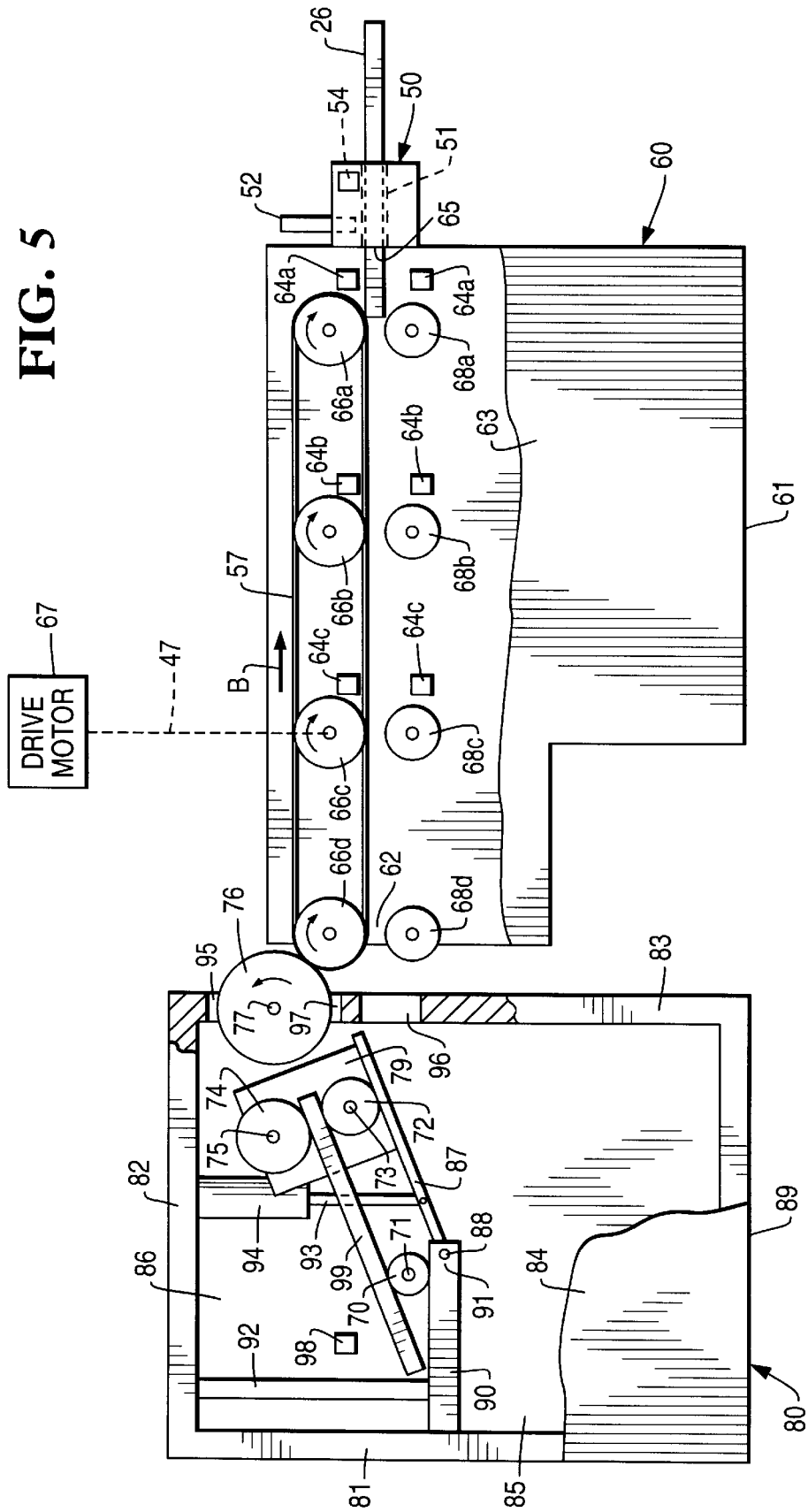

After the shutter door 52 has moved from the closed position shown in FIG. 3 to the open position shown in FIG. 4, the customer 24 is allowed to further insert the leading edge of the user identification card 26 from the position shown in FIG. 4 to the position shown in FIG. 5. In FIG. 5, the leading edge of the card 26 engages the outer circumferential surface of the endless belt 57.

When the user identification card 26 is in the position shown in FIG. 5, the first sensor 64a detects the leading edge of the card and provides a signal on line 44a (shown only in FIG. 2) indicative thereof. When this occurs, the microcomputer 32 produces a signal on line 41 to actuate the drive motor 67 to rotate the drive rollers 66 about their longitudinal central axes in a direction indicated by the arrows shown in the drive rollers 66 in FIG. 5. The rotation of the drive rollers 66 moves the endless belt 57 in the direction of arrow "B" shown in FIG. 5. Since the leading edge of the card 26 engages the outer circumferential surface of the endless belt 57, the movement of the endless belt in the direction of arrow "B" in FIG. 5 results in movement of the card from the position shown in FIG. 5 to the position shown in FIG. 6.

Figure 6:
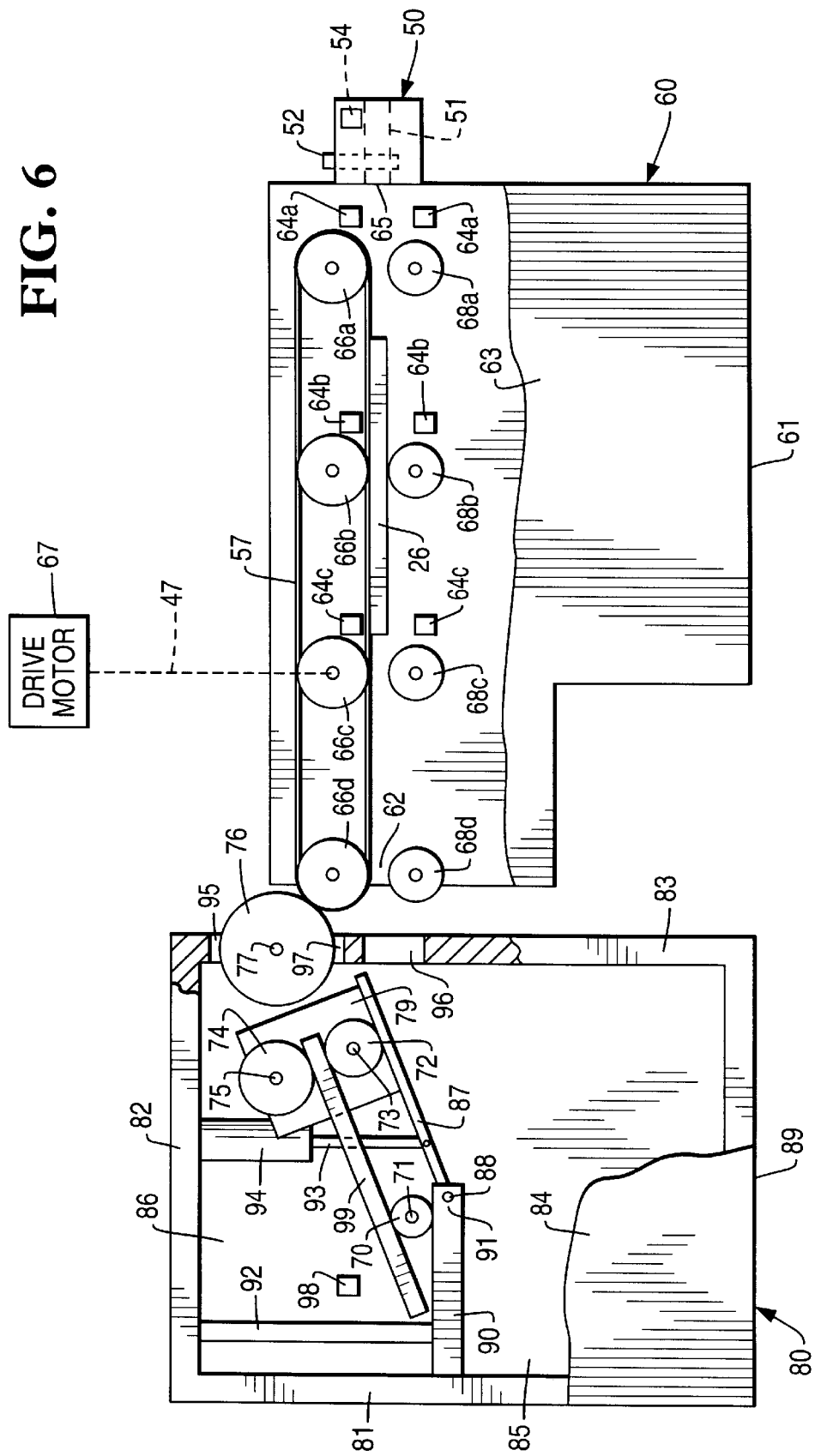

In FIG. 6, the leading edge of the card 26 is detected by the sensor 64c. When this occurs, the sensor 64c provides a signal on line 44c (FIG. 2) indicative thereof. In response to the signal on line 44c, the microcomputer 32 produces a signal on line 41 to turn the motor 67 off and a signal on line 52 to close the shutter door 52. While the card 26 is in the position shown in FIG. 6, the customer 24 is allowed to carry out the desired financial transaction. After completion of the financial transaction, the shutter door 52 is opened and the motor 67 is actuated to rotate in the opposite direction. This results in rotation of the drive rollers 66 in the opposite direction, as indicated by the arrows shown in the drive rollers 66 in FIG. 7. The rotation of the drive rollers 66 moves the endless belt 57 in the direction of arrow "C" shown in FIG. 7. This results in movement of the card 26 from the position shown in FIG. 6 to the position shown in FIG. 7. The card 26 is thereby returned to the customer 24.

Figure 7:
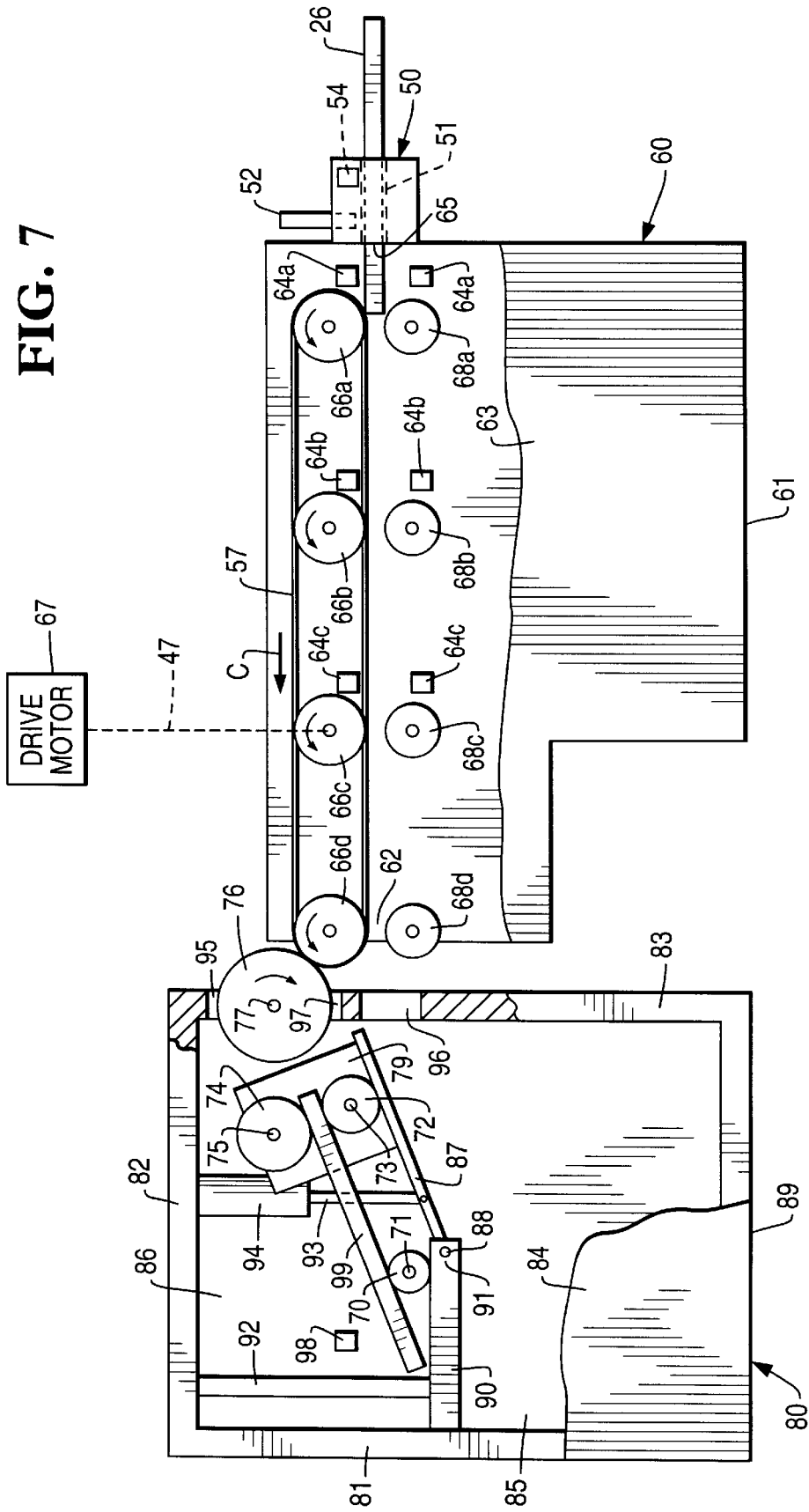
Figure 8:
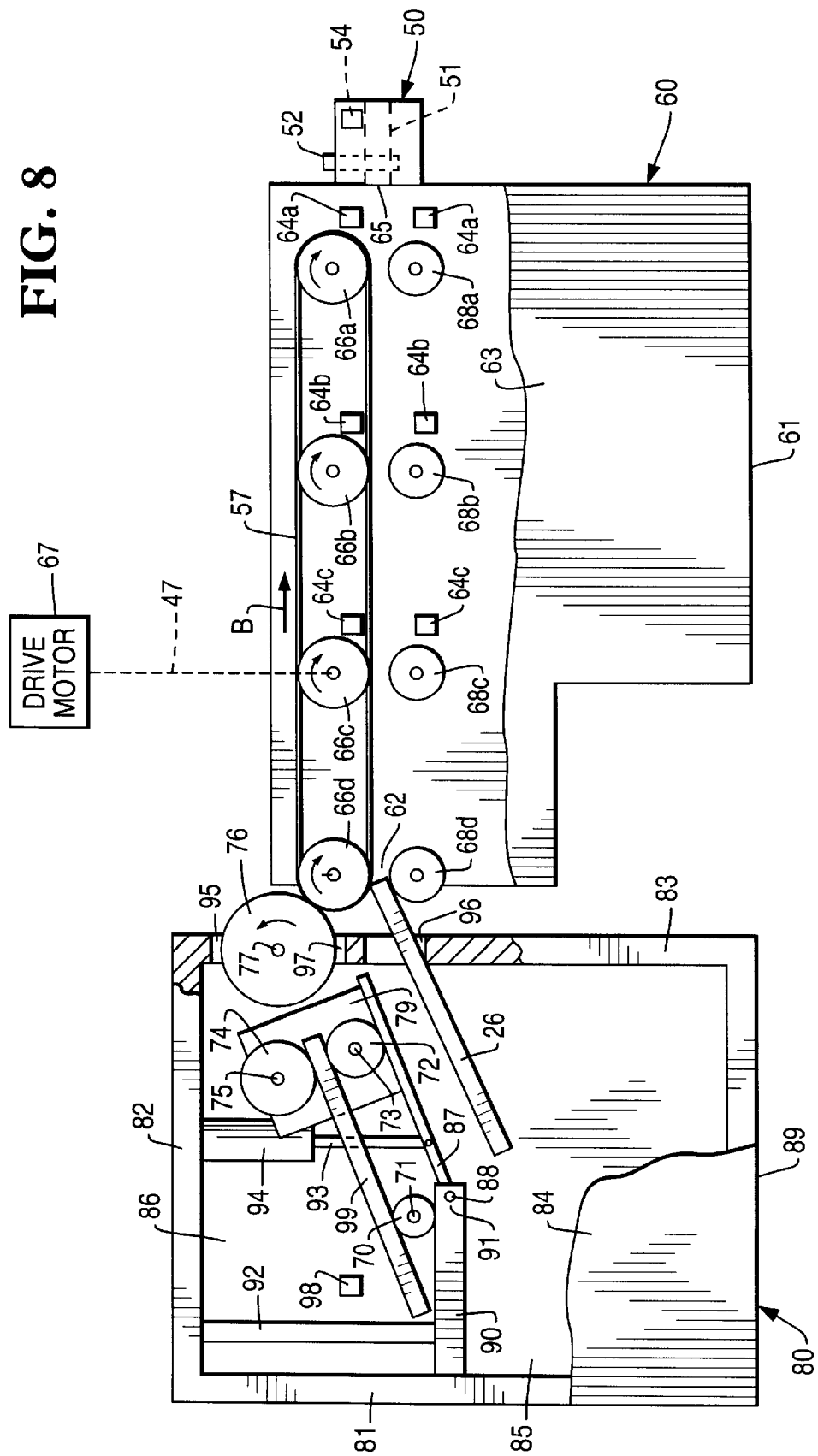

In the event that the customer 24 forgets to take the returned user identification card 26 shown in FIG. 7 and walks away from the ATM 10 after carrying out the financial transaction, the motor 67 is actuated to cause the card to move from the position shown in FIG. 7 to the position shown in FIG. 8. More specifically, the motor 67 is actuated to move the card 26 from the position shown in FIG. 7 to the position shown in FIG. 8 when the sensor 64a still detects the leading edge of the card 26 upon elapse of a predetermined amount of time since return of the card to the position shown in FIG. 7. Immediately after the card 26 moves from the position shown in FIG. 7 to the position shown in FIG. 8, the shutter door 52 closes as shown in FIG. 8.

Figure 9:
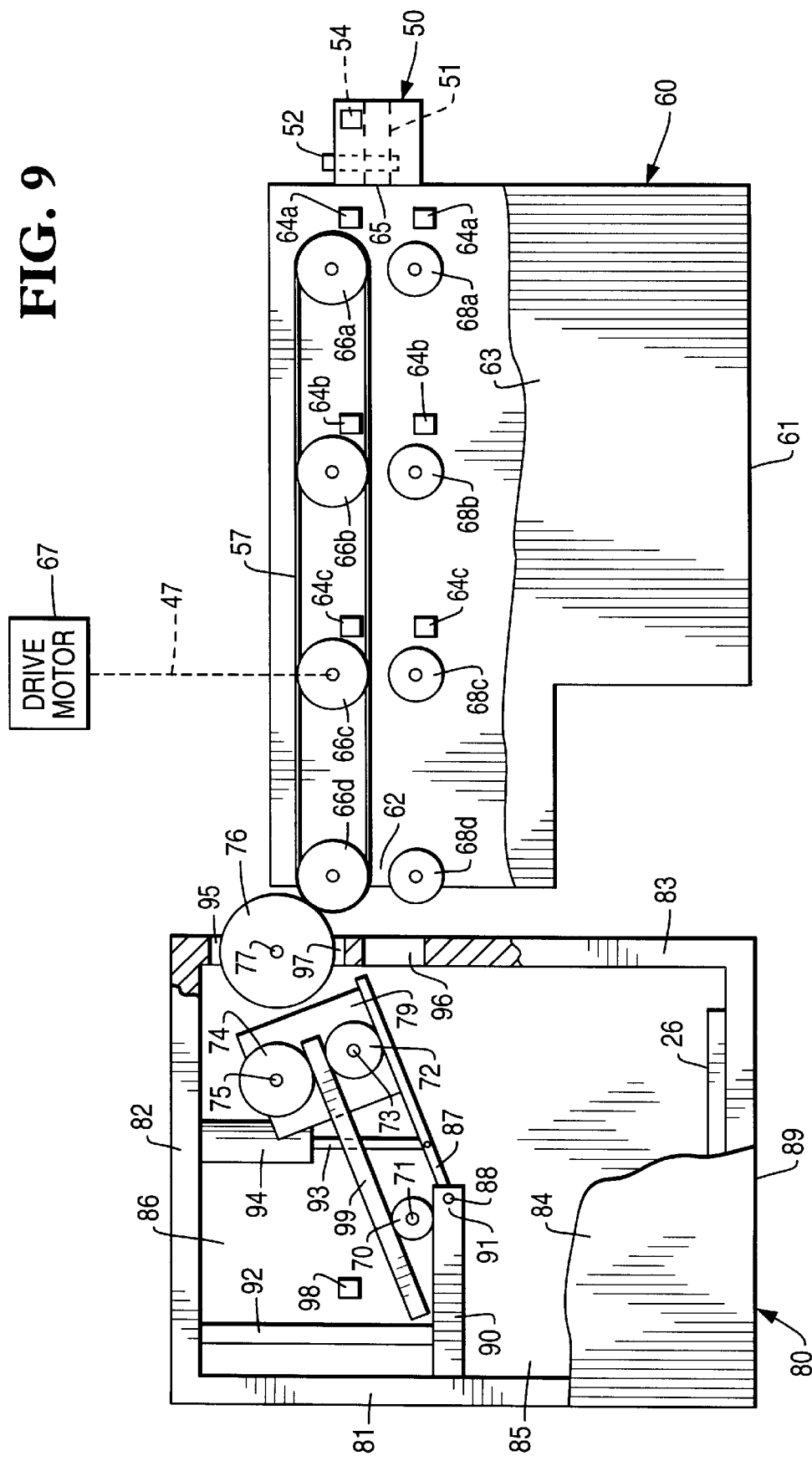

The card then drops from the position shown in FIG. 8 to the position shown in FIG. 9 inside the capture bin 80. The card 26 is thereby retained in the capture bin 80 to prevent a person who is not the card owner from taking the card. Shortly after the card 26 drops from the position shown in FIG. 8 to the position shown in FIG. 9, the first motor 67 turns off. This feature of retaining the card 26 after elapse of a predetermined amount of time is well known.

Figure 10:
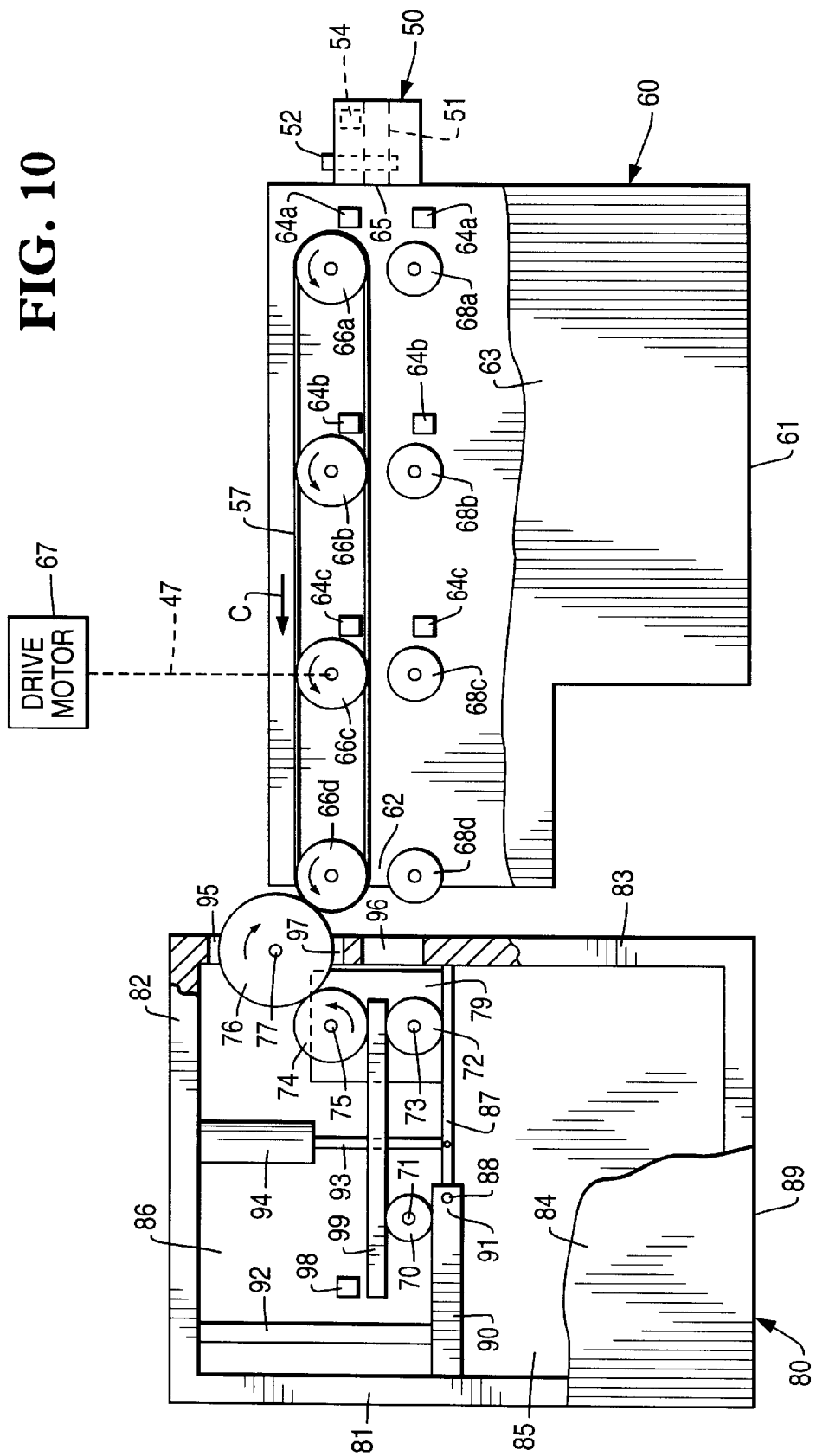

With specific reference to FIG. 7 in which the customer 24 has just completed a financial transaction, the capture bin 80 includes an inwardly extending wall portion 90 having one end thereof fixedly connected to the back wall portion 81. The inwardly extending wall portion 90 has an opposite free end 91 which extends inwardly to divide the space inside the capture bin into a lower compartment 85 and an upper compartment 86. A support piece 92 interconnects the top wall portion 82 and the inwardly extending wall portion 90 to support the inwardly extending wall portion. One end of a diverter flap 87 is pivotably connected via a pivot pin 88 to the free end 91 of the inwardly extending wall portion 90. The diverter flap 87 is pivotable between an open position as shown in FIG. 7 and a closed position as shown in FIG. 10.

An energizable solenoid 94 having a rod 93 connected to the armature (not shown) of the solenoid 94 is located in the upper compartment 86 and is fixedly mounted to the top wall portion 82. The solenoid 94 is mounted to the top wall portion 82 such that the rod 93 extends in a downward direction as viewed in FIG. 7. The rod 93 is connected to the diverter flap 87 in a manner as shown in FIG. 7 to move the diverter flap from the open position shown in FIG. 7 to the closed position shown in Fig. 10. The solenoid 94 is shown in FIG. 7 in a de-engergized condition, and is shown in FIG. 10 in an energized condition. The microcomputer 32 controls operation of the solenoid 94 in accordance with an application program stored in the memory unit 34 to control movement of the diverter flap 87 between the open position shown in FIG. 7 and the closed position shown in FIG. 10. The movement of the diverter flap 87 between the open position shown in FIG. 7 and the closed position shown in FIG. 10 will be described in detail later.

A first roller 70 is located in the upper compartment 86 and is rotatably mounted about its longitudinal central axis on a pivot pin 71 which is fixedly connected at one end to the side wall portion 84. A generally flat plate 79 is mounted on the diverter flap 87 and is movable together with the diverter flap. A second roller 72 is located in the upper compartment 86 and is rotatably mounted about its longitudinal central axis on a pivot pin 73 which is fixedly connected at one end to the flat plate 79. A third roller 74 is located in the upper compartment 86 and is rotatably mounted about its longitudinal central axis on a pivot pin 75 which is fixedly connected at one end to the flat plate 79.

A fourth roller 76 is located in a generally rectangular opening 95 defined in the front wall portion 83. The fourth roller 76 is rotatably mounted about its longitudinal central axis on a pivot pin 77 which is fixedly mounted between oppositely-facing interior edge surfaces 97 (only one of these edge surfaces 97 being shown in FIG. 7) defining the opening 95. The capture bin 80 is positioned relative to the card reader 60 such that the outer circumferential surface of the fourth roller 76 frictionally engages the outer circumferential surface of the endless belt 57.

A diagnostic card 99 is located in the upper compartment 86. Preferably, the diagnostic card 99 has a size which is identical to the size of a standard magnetic stripe card. The diagnostic card 99 contains magnetic data which, when read by the card reader 60, enables the microcomputer 32 to determine if components of the card reader are functioning smoothly and properly. The construction and operation of such diagnostic cards is well known and, therefore, will not be described.

In accordance with the present invention, the diagnostic card 99 resides in a position adjoining the card reader 60. As shown in FIG. 7, one end of the diagnostic card 99 is frictionally engaged between the second and third rollers 72, 74. The other end of the diagnostic card 99 rests on the first roller 70. The diagnostic card 99 is shown in FIG. 7 in a resting position. A sensor 98 detects the presence of the diagnostic card 99 in its resting position and provides a signal on line 48 (shown only in FIG. 2) indicative thereof. The diagnostic card 99 is movable from the position shown in FIG. 7 to a position shown in FIG. 10. The diagnostic card 99 is shown in FIG. 10 in a testing position. The movement of the diagnostic card 99 between the position shown in FIG. 7 and the position shown in FIG. 10 is under control of an application program stored in the memory 34. The movement of the diagnostic card 99 between the position shown in FIG. 7 and the position shown in FIG. 10 is described in detail hereinbelow.

Upon the microcomputer 32 receiving a command signal from the remote terminal 28 in response to an input from a service technician located at the remote terminal, the diagnostic card 99 is moved into the transport path 62 of the card reader 60 for the purpose of performing diagnostic tests on the card reader 60. When this occurs, the microcomputer 32 provides a signal on line 43 to energize the solenoid 94. When energized, the rod 93 connected to the armature of the solenoid 94 moves downward and thereby moves the diverter flap 87 from the open position shown in FIG. 7 to the closed position shown in FIG. 10. When the diverter flap 87 is in the position shown in FIG. 10, the outer circumferential surfaces of the third and fourth rollers 74, 76 frictionally engage each other.

The microcomputer 32 then produces a signal on line 42 to actuate the motor 67. The motor 67 is actuated such that the drive rollers 66 rotate in a direction indicated by the arrow shown in the drive roller 66d in FIG. 10. This rotation, in turn, causes the third and fourth rollers 74, 76 to rotate in the directions indicated by the arrows shown in the third and fourth rollers 74, 76 in FIG. 10.

Figure 11:
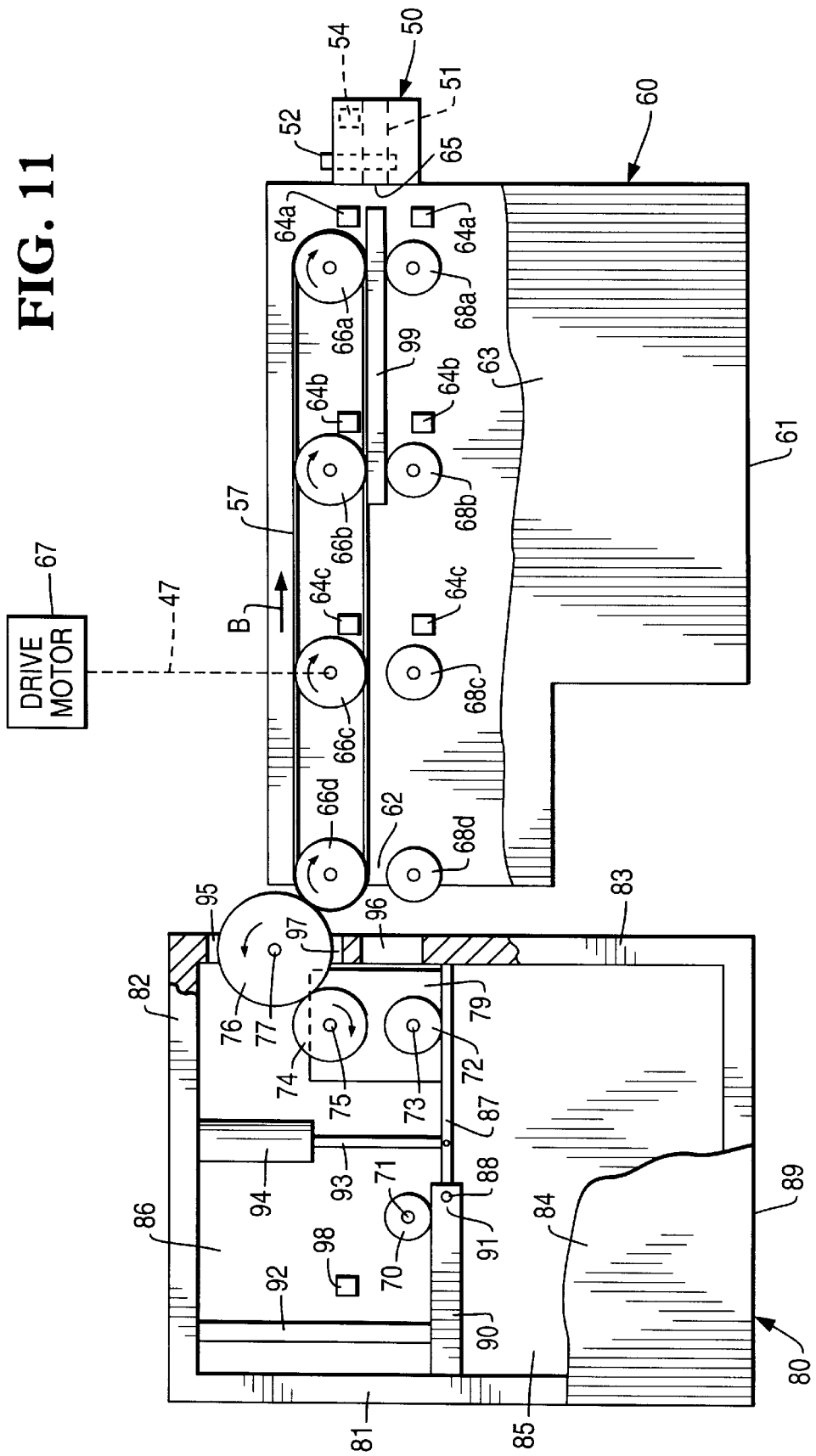

The rotation of the third and fourth rollers 74, 76 and the drive rollers 66, in the manner as just described, results in movement of the diagnostic card 99 from the position shown in FIG. 10 to the position shown in FIG. 11. In FIG. 11, the leading edge of the diagnostic card 99 is detected by the sensor 64a. When the sensor 64a detects the leading edge of the diagnostic card 99, the sensor 64a provides a signal on line 44a indicative thereof.

Figure 12:
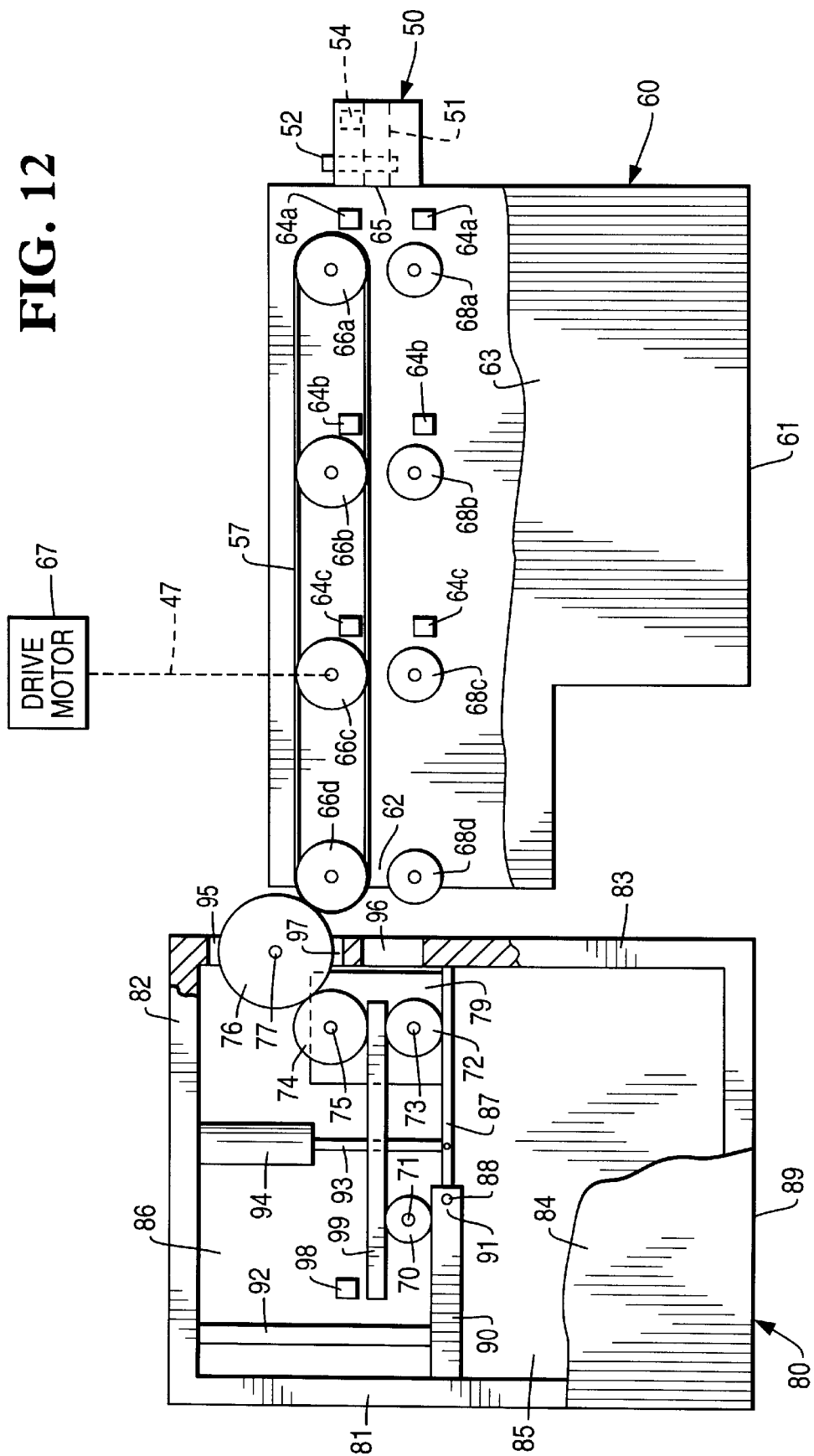

In response to the signal on line 44a, the microcomputer 32 provides a signal on line 41 to rotate the motor 67 in the opposite direction which, in turn, results in rotation of the drive rollers 66 in the direction of the arrows shown in the drive rollers 66 shown in FIG. 11. Also, the third and fourth rollers 74, 76 rotate in the directions indicated by the arrows shown in the third and fourth rollers 74, 76 in FIG. 11. This results in return movement of the diagnostic card 99 from the position shown in FIG. 11 to the position shown in FIG. 12. The return of the diagnostic card 99 back to the position shown in FIG. 12 is detected by the sensor 98 which provides a signal on line 48 indicative thereof. In response to the signal on line 48, the microcomputer 32 provides a signal on line 41 to turn off the motor 67 off.

When the diagnostic card 28 is in the position shown in FIG. 11, the card reader 60 reads the magnetic data contained on the diagnostic card. The microcomputer 32 then uses this magnetic data to perform diagnostic tests to determine if components of the card reader 60 are functioning smoothly and properly. If the microcomputer 32 determines that the card reader 60 passes all of the diagnostic tests, the microcomputer provides a signal indicative thereof. Upon this determination, the card reader 60 is ready to accept a user identification card from the next customer after the diagnostic card 99 returns to the resting position shown in FIG. 12.

However, if the microcomputer 32 determines that the card reader 60 has failed one or more of the diagnostic tests, the microcomputer 32 provides a signal indicating that the card reader 60 has malfunctioned and needs to be serviced. Upon this determination, the microcomputer 32 provides a signal on line 46 to disable the shutter door 52 as well as other signals required to disable the ATM 10 and prevent further use of the ATM. When disabled, the shutter door 52 is maintained in its closed position to prevent a user identification card from being inserted into the transport path 62.

When the microcomputer 32 determines that the card reader 60 is not operating properly and needs to be serviced, the microcomputer 32 may send diagnostic-type messages to the remote central terminal 28. These messages are displayed on a display at the remote central terminal 28 to provide the service technician with information useful in servicing the card reader 60. For example, the diagnostic-type messages may contain information which suggests to the technician certain parts of the card reader 60 which may need to be replaced.

It is contemplated that the card 99 may be a cleaning type of card instead of a diagnostic type of card. Cards of the cleaning type are known and commercially available. If the card 99 is of the cleaning type, parts of the card reader 60 are cleaned upon each complete movement of the card 99 from its resting position to its testing position and then back to its resting position. The movement of the card 99 would be controlled by a service technician located at the remote terminal, in the same manner as already described hereinabove.

Although a single card (either a diagnostic card or a cleaning card) has been described as residing in a position adjacent the card reader 60, it is contemplated that more than one card may reside in different positions adjacent the card reader 60. In this case, a structure is provided which allows the service technician located at the remote terminal 28 to selectively control movement of each card to perform different maintenance operations of the card reader 60.

A number of advantages result by providing an ATM and a method of operating the ATM in accordance with the present invention. One advantage is that card readers of a large number of ATMs may be serviced by a single technician located at a remote terminal. This saves time for the technician resulting in cost savings. Another advantage is that ATMs currently in the field can be easily retrofitted at relatively low cost with features of the present invention.

Still another advantage is that the technician is able to identify spare components of the card reader which have the greatest chance of being needed for replacement, before actually going out to the particular ATM to service the card reader of that ATM when a service trip is required. Again, this saves time for the technician resulting in cost savings. Also, the quantity of spare components kept in inventory may be reduced.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of performing a maintenance operation of a card reader of a self-service terminal (SST) from a remote location, the method comprising the steps of:

(a) moving a card residing in a position adjoining the card reader from a resting position to a testing position along a transport path of the card reader in response to commands from a person at the remote location to enable the person at the remote location to perform a maintenance operation of the card reader; and (b) returning the card from the testing position to the resting position after the maintenance operation of the card reader has been performed in step (a).

2. A method according to claim 1, wherein step (a) includes the step of:

(a-1) moving the card from the resting position to the testing position to perform a diagnostic test on the card reader based upon information contained on the card when the card is in the testing position.

3. A method according to claim 2, further comprising the step of:

(c) indicating proper functioning of the card reader after the card has returned to the resting position in step (b).

4. A method according to claim 2, further comprising the step of:

(c) indicating malfunctioning of the card reader after the card returns to the resting position in step (b); and (d) preventing a user identification card from being introduced into the transport path of the card reader when malfunctioning of the card reader is indicated in step (c).

5. A method according to claim 1, wherein step (a) includes the step of:

(a-1) moving the card between the resting position and the testing position to clean parts of the card reader.

6. A self-service terminal (SST) for communicating across a network with a remote terminal, the SST comprising:

a card reader having a transport path and a card entry slot at one end of the transport path for receiving a user identification card from a SST user to enable the SST user to gain access to the SST;

a card residing in a position adjoining the card reader and movable between a first position and a second position along the transport path of the card reader;

a transport mechanism for moving the card between the first and second positions; and a processor unit for controlling the transport mechanism to move the card between the first and second positions in response to command signals received from the remote terminal.

7. A SST according to claim 6, wherein the card is a diagnostic type of card having a size which is substantially identical to the size of a standard magnetic stripe card, the processor unit controlling the transport mechanism to move the diagnostic card between the first and second positions to perform a maintenance operation of the card reader in response to the command signals from the remote terminal.

8. A SST according to claim 6, wherein the card is a cleaning type of card having a size which is substantially identical to the size of a standard magnetic stripe card, the processor unit controlling the transport mechanism to move the cleaning card between the first and second positions to clean parts of the card reader in response to the command signals from the remote terminal.

9. A SST according to claim 6, wherein the card reader includes a number of sensors located along the transport path for detecting the presence of either the card or a user identification card along the transport path.

10. A SST according to claim 9, wherein each sensor includes a light source located on one side of the transport path and a light sensor facing the light source and located on the other side of the transport path.

11. A SST according to claim 6, wherein the card reader includes a transport mechanism for moving a user identification card along the transport path when the SST user inserts the user identification card into the card entry slot of the card reader, the transport mechanisms cooperating to support movement of either the card or a user identification card along the transport path of the card reader.

* * * * *